United States Patent [19]

Schmiesing

[11] 4,091,940
[45] May 30, 1978

[54] SILO UNLOADER

[76] Inventor: Gregory Schmiesing, R.R. No. 1, New Bremen, Ohio 45869

[21] Appl. No.: 715,451

[22] Filed: Aug. 18, 1976

[51] Int. Cl.² .............................................. B65G 65/38
[52] U.S. Cl. ................................. 214/17 DB; 302/56
[58] Field of Search ................... 214/17 DB; 302/56; 212/55; 296/57 A; 198/856

[56] References Cited

U.S. PATENT DOCUMENTS

| 2,684,159 | 7/1954 | Oldenkamp | 212/55 |
| 2,995,260 | 8/1961 | McCann et al. | 214/17 DB |
| 3,009,732 | 11/1961 | Brown | 296/57 A |
| 3,035,719 | 5/1962 | McLean | 214/17 DB |
| 3,076,558 | 2/1963 | Berquist et al. | 212/55 |
| 3,308,973 | 3/1967 | Heitzman | 214/17 DB |
| 3,370,721 | 2/1968 | Seymour et al. | 214/17 DB |
| 3,416,676 | 12/1968 | Nolin, Jr. | 198/856 X |
| 3,653,520 | 4/1972 | Milchner | 214/17 DB |

Primary Examiner—Albert J. Makay
Attorney, Agent, or Firm—Jerome P. Bloom

[57] ABSTRACT

The invention provides a silo unloader having in connection with its spout assembly, comprised of its discharge spout and its underlying torque arm, features of improvement including means automatically functioning to not only facilitate raising and lowering movements of the spout assembly but also to alleviate the stress and strain normally imposed on a torque arm in the course of a silo unloading operation. The torque arm is distinguished by a telescoping construction which accommodates most readily the eccentricities which occur in the tracking movement of the auger at the base of the unloader as it moves in both a circular and vertical direction within a silo, even when it is out of round.

The auger motor of the unloader has control means which are mounted on the torque arm. Such control means are conditioned to interrupt the operation of this motor in response to stress being placed on the torque arm by reason of the fact the related auger encounters an obstruction in the path of its movement or is choked by the silage on which it operates.

17 Claims, 6 Drawing Figures

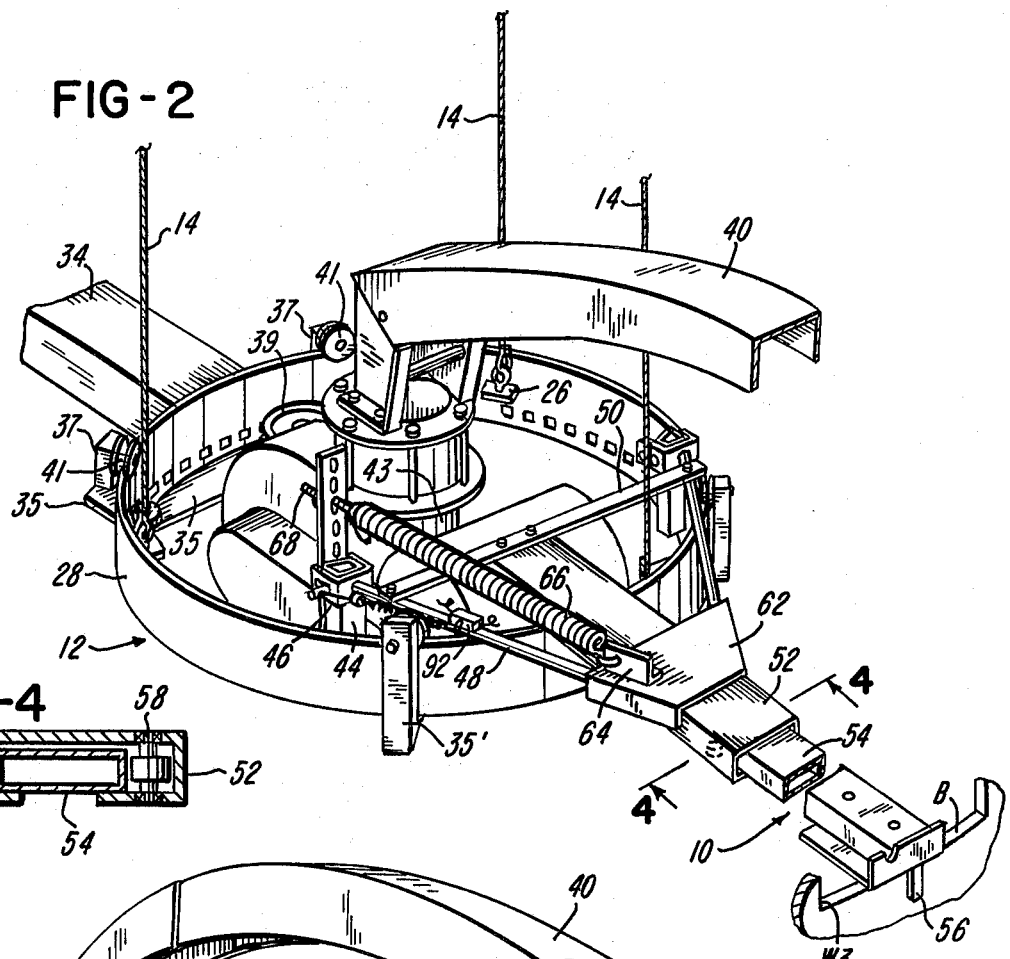
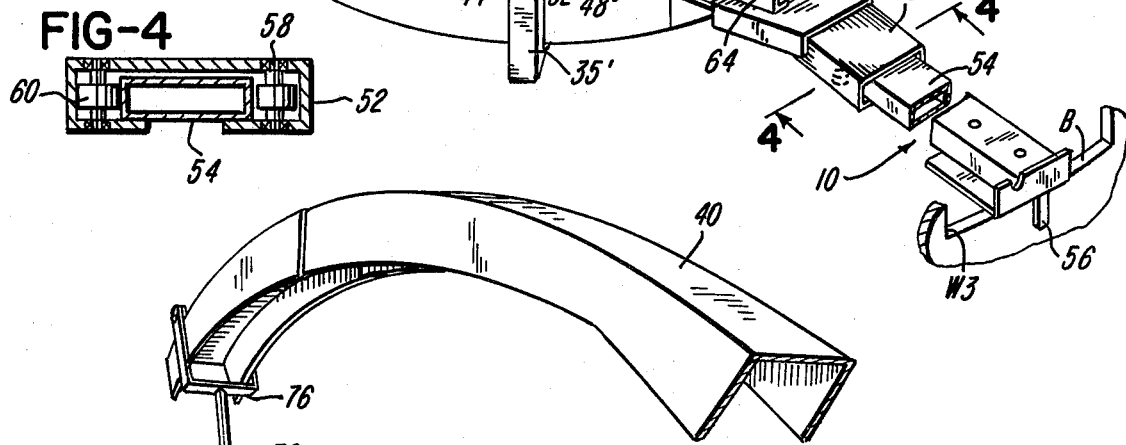
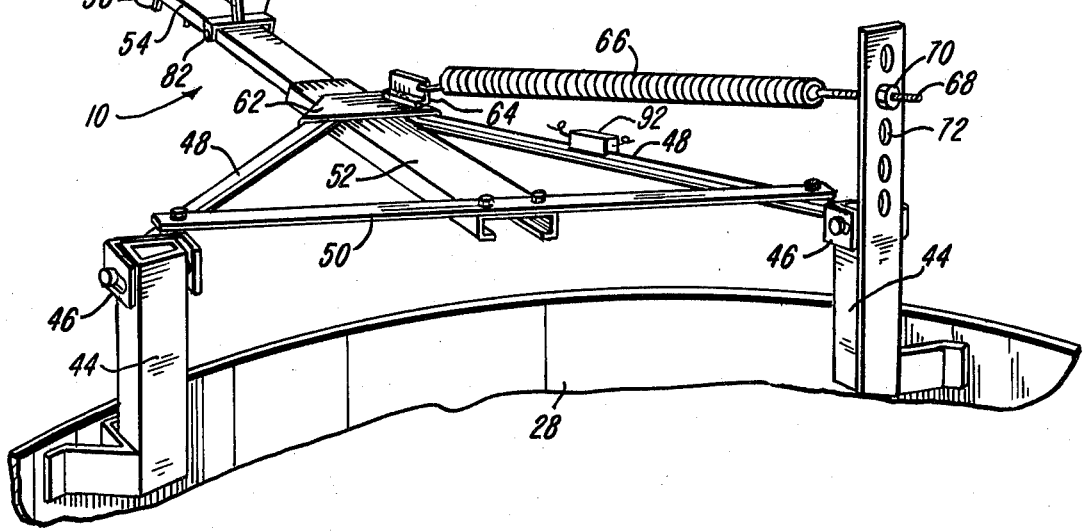

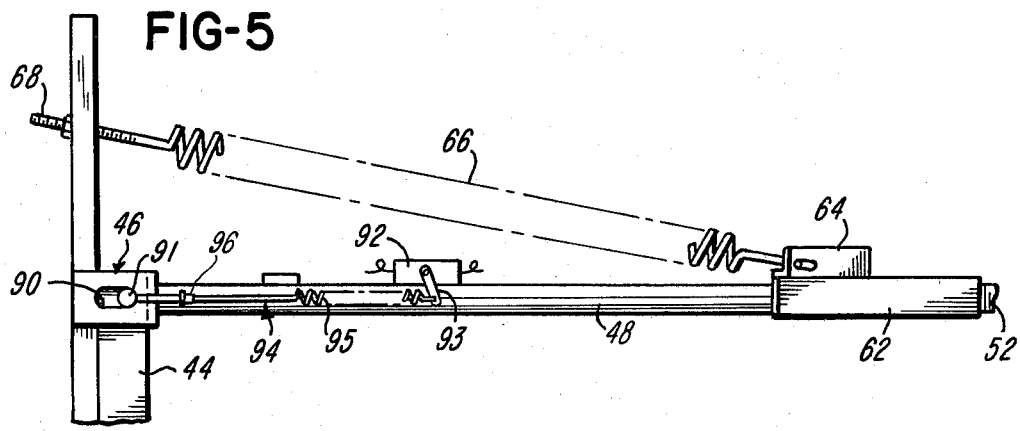
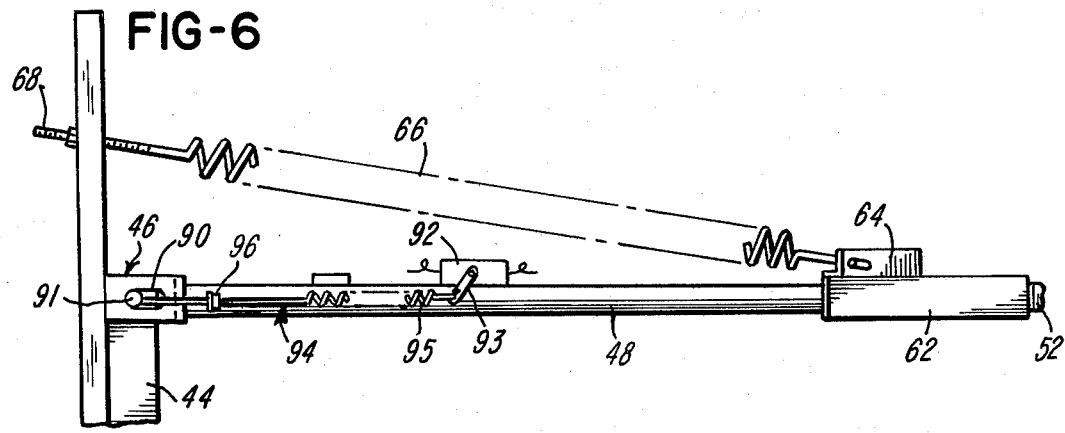

SILO UNLOADER

BACKGROUND OF THE INVENTION

This invention relates to improvements in silo unloaders and, more particularly, to improvements in the construction and function of their discharge spout assembly comprised of a discharge spout and the underlying torque arm on which the outer end of the spout is based. Preferred embodiments feature control means connected to the torque arm conditioned to interrupt the operation of the auger motor should stress be placed on the torque arm by reason of the fact the auger driven by the motor encounters an obstruction or is choked by the silage on which it operates. The improvements are such to not only facilitate the unloading of a silo but also to substantially reduce the stress and wear on unloader parts and the amount of maintenance which is normally required in respect thereto.

By way of illustration the invention improvements will be particularly described in application to a conventional unloader of the type which includes a tripod-like structure designed to mount in bridging relation to the upper end of a silo and to suspend, by cables, a tracking ring. In such an unloader, the auger unit is connected in underlying relation to the ring and supported by said ring with the intent that it should rotate about a vertical axis. To this end the auger unit mounts in connection therewith a plurality of rollers which are circularly spaced and designed to contact and bear on the inner surface of a silo wall as the auger moves over an underlying bed of silage. The rollers in their composite are intended to assist the auger to maintain a relatively uniform level of travel during a circular movement thereof, in the course of which the auger will pick up and move silage to a connected blower. The blower functions to discharge the silage in a pressured flow by way of an overlying spout. As mounted, the discharge spout extends upward and outward from a point central to the tracking ring. An underlying torque arm having a pivoted connection with the tracking ring supports on the outer projected end thereof a bracket for mounting the discharge end of the spout in overlying spaced relation thereto. The outer end of the torque arm hooks over the frame of a silo discharge opening to fix the position of the spout and direct its discharge through the opening. At the same time it limits rotation of the spout with the underlying auger. By reason of the fact that the spout assembly, comprised of the discharge spout and its underlying torque arm, must be manually moved from one silo discharge opening to another as the level of the silage diminishes during the unloading of the silo, the torque arm which underlies the discharge spout normally has a telescoping character.

Long experience has indicated that almost every silo is out of round. This very fact has produced much damage in use of silo unloaders and dictated the need for considerable maintenance and replacement of parts during the course of their operation, particularly in relation to the discharge spout and the underlying torque arm. Such problems have stemmed from the fact that as an auger tracks over a silage bed it will, be reason of its suspended mount and by reason of the fact that the wall surface upon which its projected rollers bear is out of round, be caused to constantly shift the vertical axis about which it operates to various inclined positions. This produces undesirable elements of force which are reflected to the torque arm and the outer end of the discharge spout. Since the auger unit is not only moving in a generally circular path but constantly lowering, these undesirable elements of force will tend to bend, twist and produce a binding of the telescoping parts of the torque arm, the natural consequence of which is to interfere with their function in their efforts to accommodate the lowering movement of the auger together with the associated parts of the unloader. The damage to the torque arm is compounded since, when it binds and does not properly function as the unloader constantly moves downward, its resistance to accommodating such movement is reflected to underlying structure, producing further unbalance in the auger function. Under such conditions, not only are wear, tear, and maintenance requirements increased in respect to the telescoping torque arm but also in respect to other parts of the unloader to which the problems produced in the function of the torque arm are reflected.

Further problems evidenced in use of prior art unloaders stem from the fact that as the unloader is moved downwardly within a silo during its function there are several points at which the discharge spout assembly must be adjusted to change the direction of its discharge from one window to a next lower silo window or opening. In accordance with the practice, one must manually lift the whole spout assembly, including its underlying torque arm, from the window frame to which the torque arm is hooked, back it off and drop it until the torque arm is aligned with and adjusted so it can be hooked on to the frame of the next lower window or opening in the silo wall. If there has been binding and damage to a torque arm due to circumstances such as above described, there are real problems in adjusting the torque arm to accommodate this change.

Another serious problem in the use and maintenance of unloaders of the prior art is that by reason of its large size and the need for frequent handling thereof the discharge spout is made of very light gauge metal. Since the discharge spout is subjected to a considerable amount of friction and wear in use thereof it will quickly deteriorate and require replacement. The experts in the prior art have long felt that users of the silo unloaders had to live with this problem as the better alternative to making the discharge spout of heavier metal, thereby increasing greatly the manual effort required in the process of adjusting the spout assembly to such a degree as to make it very difficult, if not impossible, for one man to handle the spout. The seriousness of this problem should be well recognized since many times only one man is available to operate the silo unloader and in many instances the silo structure dictates that there is insufficient room for more than one man to manipulate the spout assembly in moving the same from one silo window to another. There is another very serious problem in the use of silo unloaders of the prior art. Depending upon the sophistication of the unloader device the winch employed to lower the tracking ring is either motorized or operated manually through the medium of a handle. In either case the winch might be energized for too long a period of time or operating too fast, in which event the structure will be lowered too deeply into the silage and the solids will choke up and obstruct the free movement of the auger. The natural result is to place too much load on the auger motor and, in particular, on the related drive mechanism through the medium of which the auger is driven in a circular path. In this last respect the clutch embodied in the ring drive may slip. This will require immediate attention to and adjustment of the clutch mechanism. If the clutch does not slip and there is a continued drive effort, the torque arm in engagement with the frame of the window through which the unloader spout is discharging will shift to engage the side of the frame. When this last occurs, there is applied to the torque arm a lateral strain which bends its component parts, again producing a condition requiring maintenance and/or replacement of parts. Similar difficulties occur when in the course of the unloader operation the silage handled is too wet. In such case the weight of the silage is such it may not discharge through the silo window but will fall short thereof and pile up under the window in the path of the rotating auger and its housing. Should the wet silage pile up sufficiently, when the auger turns in a circular path the housing of the auger will run up against the piled silage and there will occur difficulties such as just described when the auger is choked up by being buried in the silage.

It is to the solution of the foregoing problems that the present invention is directed.

SUMMARY OF THE INVENTION

The present invention provides a simple but most effective solution to those serious problems found in the silo unloading art as described above.

In a preferred embodiment it provides an improved telescoping torque arm for support of the unloader discharge spout incorporating roller bearing means the function of which unexpectedly and significantly reduces the normal wear and tear on a torque arm in a silo. unloading operation. As will be obvious, the construction provided also facilitates the positioning and repositioning of the discharge spout as required. The latter is further facilitated by resilient connector means providing a biasing connection between the torque arm and the frame portion of the unloader which provides its base support. While this resilient connection is not so provided as to balance the spout assembly with reference to its support, it does nevertheless provide for storage of energy in the function thereof the natural result of which is to materially reduce the load factor in the manipulation of the spout assembly from one silo window or door level to the next lower level, as is necessarily required during a silo unloading operation.

In preferred embodiments of the invention the torque arm is mounted to its base structure by connections permitting the longitudinal shift thereof under the influence of applied stress, such as would occur in the event the related auger should encounter an obstruction which would inhibit its free and continuing circular movement. Means provided to interconnect the torque arm and its base are arranged to incorporate therein a control for a switch included in the circuit of the auger drive motor. The arrangement is such that if the stress applied to the torque arm in the operation of the auger proves sufficiently great to induce the longitudinal shift of the arm relative its base, in the course of such shift the related switch will be operated to open the circuit of the auger drive motor. In this manner the drive motor for the auger is stopped before the movement thereof under the adverse circumstances which exist would create the damage which would otherwise occur in use of the prior art unloader devices, as above described.

With the foregoing in mind, it is a primary object of the present invention to apply improvements to silo unloaders making them easier to manipulate, more efficient and satisfactory in use, adaptable to a wide variety of comparable applications and considerably less likely to malfunction.

A further object is to provide improvements in the spout assembly of a silo unloader enabling an easier and safer manipulation thereof.

Another object of the invention is to provide an improved torque arm and mount thereof in a silo unloader which substantially reduces the incidence of binding, wear and damage thereto in the operation of the unloader and consequent damage to associated unloader parts.

Another object of the invention is to provide a silo unloader with means conditioned to automatically interrupt the operation of its auger drive motor should the related auger encounter an obstruction or be choked by the silage on which it operates.

An additional object of the invention is to provide a silo unloader having improvements in its discharge assembly comprised of its discharge spout and an underlying torque arm possessing the advantageous structural features, the inherent meritorious characteristics and the means and mode of use herein described.

With the above and other incidental objects in view as will more fully appear in the specification, the improvements of the invention intended to be protected by Letters Patent consist of their features of construction, the parts and combinations thereof, and the mode of their operation as hereinafter described or illustrated in the accompanying drawings, or their equivalents.

Referring to the accompanying drawings wherein the invention improvements are incorporated, by way of illustration only and not by way of limitation as to their application, in a type of silo unloader such as first mentioned and in a preferred but not necessarily the only form of their embodiment, FIG. 1 is a top perspective view of an unloader embodying features of the present invention, shown within a silo and with details thereof illustrated in a generally diagrammatic fashion;

FIG. 2 is a fragmentary perspective view of the unloader particularly illustrating details of the spout assembly;

FIG. 3 is a further fragmentary view illustrating pertinent detail of the torque arm structure embodied in the spout assembly of the unloader, the view being taken from the rear of the torque arm structure as portrayed in FIG. 2, parts of the unloader structure being removed in this illustration, for clarity of disclosure;

FIG. 4 is a view taken on line 4—4 of FIG. 2;

Figure 1:
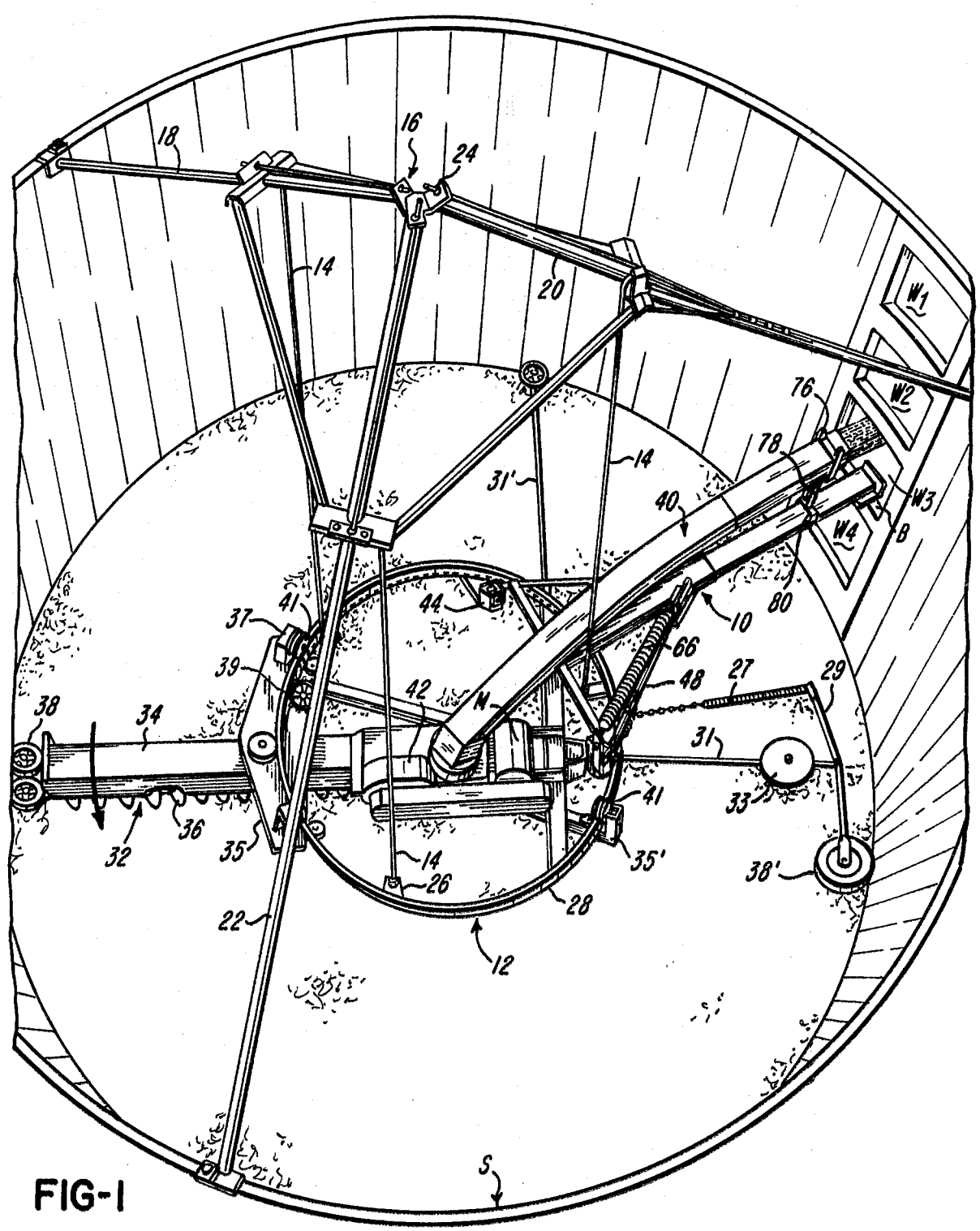

FIG. 5 is a fragmentary view taken from one side of the structure shown in FIG. 3, illustrating, in a generally diagrammatic fashion, control means for the auger drive motor of the unloader which are embodied in accordance with the present invention, the arrangement of parts indicating a condition wherein the auger of the unloader is freely operating; and FIG. 6 is a view similar to that shown in FIG. 5, indicating, however, a condition of the illustrated control means as would occur in the event the auger of the unloader should meet with an obstruction or be choked with silage in the course of its operation.

Like parts are indicated by similar characters of reference throughout the several views.

A silo S is shown in the accompanying drawings to embody vertically spaced windows or openings $W_1$, $W_2$, $W_3$ and $W_4$ through which silage may be discharged. Each opening is surrounded by a frame of rectangular configuration the base portion B of which serves as an anchor for the torque arm 10 of a silo unloader 12.

The unloader 12 in which the improvements of the invention are embodied is one of the type first described. In use, as shown, it is suspended within a silo by means of cables 14 mounted in connection with a tripod-like structure 16. The structure 16 comprises three legs 18, 20 and 22, suitably connected at their one ends in a circularly spaced relation to a bracket structure 24. The bracket structure 24 positions uppermost and centers over the top interior of the silo while the legs 18, 20 and 22 extend outwardly and downwardly therefrom to triangularly position and have their lower ends releasably engaged to circularly spaced portions of the silo wall which forms the tripod base.

As shown, there are three of the cables 14 suitably mounted to pulley assemblies in connection with the frame 16. The one end portions of the three cable elements are arranged to vertically depend in three parallel lines, the lower end of each of which is anchored to a bracket 26 in connection with the upper edge of a tracking ring 28. The opposite ends of the cables 14 are extended in a manner not shown to connect to a winch which is normally provided at the base of the silo so it may be operated as and when required to lower or raise the tracking ring 28. The winch may be provided with automatic controls to produce a timed lowering of the tracking ring in an unloading operation or the winch may be one which is manually operated. In either event the related improvements and advantages of the invention herein described will similarly function.

The brackets 26 are equidistantly spaced and form part of the ring structure, constituting therewith a suspended base frame which supports, in turn, an auger unit 32 which positions in underlying relation to the ring 28. The unit 32 includes a generally rectangular housing 34 which extends radially of and projects outwardly from the ring 28. The outwardly projected end of the housing 34 mounts a pair of horizontally oriented side by side wheels 38 arranged to bear on the interior surface of the silo wall. Mounted within and to extend longitudinally of the housing 34 is an augur 36 the lower portion of which extends through and below the open bottom of the housing to seat to and engage in the bed of silage thereunder within the silo S. The innermost end of auger 36 terminates adjacent a side discharge opening in the wall of housing 34 to communicate with the impeller of a blower 42. This blower is integrated with the housing 34, to move therewith in the tracking operation of the associated auger. The blower outlet is defined by a tubular projection 43 which is directed in a sense vertical to and upwardly from the housing 34, in a position central to the ring 28. Telescopically mounted about the projection 43 to accommodate the relative rotation thereof is a tubular structure the wall portion of which forms an extension of the blower outlet. Anchored to a flange external to the upper end of this tubular structure is the base of the silo discharge spout 40. The spout 40 is a two part structure the base portion of which is of short vertical extent while the upper portion pivotally connects thereto and extends upwardly and radially outward of the ring 28. The two part spout 40, as shown, is channel shaped and in cross section appears in the form of an inverted "U." As to the longitudinal extent of the two part spout, this is arcuately shaped as it extends upwardly and outwardly from its base in a vertically projected sense.

A plate member 35 affixed to and extending transversely of the top of the housing 34 underlies, in part, the ring 28 and mounts to each of its opposite ends of perpendicularly projected upwardly directed bracket 37. The brackets 37 position adjacent the outer face of the ring 28 and each thereof has in connection therewith a perpendicularly projected pivot pin mounting for rotation thereon a tracking wheel 41. Each wheel 41 is peripherally grooved and receives in such groove the upper edge of the ring 28. Further bar-like elements in connection with and extended laterally of the housing 34 mount at their projected extremities, which lie immediately outward of the ring 28, further brackets 35' which similarly mount for rotation thereon additional wheels 41. The latter wheels seat to and ride on the upper edge of the ring 28 to a side thereof remote from that bearing the wheels 41 supported by the brackets 37. By reason of this construction the auger housing 34 and its contained and connected elements provide an assembly of parts which is mounted by means of the tracking wheels 41 in a suspended and tracking relation to the base frame provided by the ring 28.

The inner wall surface of ring 28 is provided with a series of circularly spaced rectangular recesses or slots having in tracking relation thereto the peripherally projected teeth of a horizontally oriented gear 39. The gear 39 is fixed to a shaft element which is in turn fixed for rotation in the plate 35 and connected to be suitably driven from a motor M the housing of which is fixed to the housing 34. The same motor M is operatively connected to drive the impeller of the blower 42. Forming an axial extension of the housing 34 at the end thereof opposite to that including the wheels 38 is a rod 31. The rod 31 projects under and beyond the outer periphery of the ring 28 in a sense opposite to the projection of the auger 32 and, as the unloader is disposed in the silo as illustrated, its projected extremity lies in an adjacent spaced relation to a portion of the inner wall surface of the silo which is directly opposite that engaged by the wheels 38. The rod 31 adjustably mounts a counterweight 33. Means of a conventional nature are provided to fix the position of the counterweight 33 in any position along the rod 31 which circumstances require. Intermediate the ends thereof a further rod member 29 is pivotally connected to the outer projected extremity of the rod 31. One extremity of the rod 29 is suitably anchored by a spring connector device 27 to the frame incorporating the tracking ring 28. The opposite end of the rod 29 rotatably mounts a horizontally oriented wheel 38'. The spring 27 is arranged to apply a suitable bias to the rod 29 sufficient to cause the wheel 38' to abut and be maintained in bearing engagement with the inner wall surface of the silo S. A further rod 31' in connection with and projecting in a sense laterally of the structure in connection with the rear end of the housing 34 mounts at its outwardly projected extremity an additional wheel maintained in bearing engagement with the inner surface of the silo wall.

From the foregoing description it will be clear that there is provided in connection with the housing for the auger structure various means mounting a series of circularly spaced wheels which engage with and bear on the inner surface of the silo wall. These wheels are designed to effect a degree of control on the path of movement of the auger as it is operated to pick up silage and direct it for discharge from the silo by way of the spout 40. Particular attention is directed to the fact that while the auger does have the silage thereunder, it is nevertheless suspended for operation from the tracking ring 28 which provides its base frame and the support for this frame is provided only by the cables 14 in the unloader illustrated.

To this point the construction described with reference to the illustrated unloader is conventional and is similar to that found in such unloaders as the "POW-R-TRACK" built by Badger Northland Inc. Since such structure is known by those versed in the art it has been described only to the extent necessary for an understanding of and to provide a frame of reference for a description of the improvements of the present invention.

Considering now the improvements of the present invention, fixed to the inner surface of the ring 28, above the level of the recesses or slots in which the gear 39 tracks, is a pair of laterally spaced vertically projected anchor posts 44. Pivotally connected to the upper end of each post 44 is a bracket 46 connected to and forming an extension of the rear end of a rod-like member 48. The members 48 are outwardly convergent with respect to the ring 28 and their outer extremities are fixed to respectively opposite sides of an arm segment 52 constituting the rearmost part of the main beam of the torque arm 10. The part 52 is oriented radially with respect to the ring 28 and the innermost end thereof is secured intermediate the ends of a bar 50 which bridges and is connected to the divergent inner ends of the rod members 48 immediately forward of the points of their connection with the brackets 46. Overlying the top of the part 52, adjacent and spaced inwardly from its radially projected extremity, is a plate-like structure 62 the lateral edge portions of which are bent downwardly over the convergent end portions of the rod members 48 and secured thereto and to the part 52 to form an integral structure lending considerable strength and rigidity to the mount of the part 52. The part 52 is a hollow beam segment having a generally flat rectangular cross sectional configuration including in its bottom plate portion and extending the length thereof a slot. To either side of such slot the top and bottom plate portions of the part 52 are bridged by s series of longitudinally spaced perpendicularly related pivot pins 58 mounting for free rotation thereon small bearing wheels 60. The torque arm 10 is completed by an outer beam segment 54 the inner end of which is telescopically received within the outer end portion of the part 52. As seen in FIG. 4, the telescoped portion of the beam 54 is relatively freely and bearingly contained in the part 52 with the lateral sides thereof in essentially bearing relation to the rollers 60. There is not only a smooth telescoping relationship provided between the parts 54 and 52 but the construction of the parts is such that the bearing contact between the beam segments is limited. The outer and relatively projected extremity of the part 54 mounts an adapter plate embodying a hook-like finger 56 the projected extremity of which is vertically dependent to a degree greater than the depth of the cross section of the part 54. FIG. 2 of the drawings clearly illustrates, diagrammatically, that the finger 56 is employed as a hook which engages over a frame portion B of the window $W_3$ in the silo wall.

Reference is now made to FIGS. 3, 5 and 6 of the drawings. As there shown, each of the brackets 46 has a U-shaped configuration the base of which is immediately connected to the related rod-like member 48 and the open mouth of which nests the upper projected extremity of the related anchor post 44. The parallel arms of each bracket 46 include transversely aligned longitudinally extended slots 90 through which are projected pivot pins 91 anchored generally perpendicular to the sides of the post 44 nested by the bracket 46.

Mounted to one of the rod-like members 48, on the upper surface thereof and intermediate its ends, is a control switch 92 the operating arm 93 of which is positioned to depend from the switch to the outer side of the rod 48 on which the switch is mounted. The dependent projected extremity of the switch arm 93 has connected thereto one end of a cable-like element 94 the opposite end of which is anchored to the projected extremity of a pin 91 in connection with the post 44 immediately to its rear. The cable 94 embodies as a portion of the length thereof a spring section 95. Intermediate its ends the cable 94 passes through a tubular guide 96 fixed to project from the outer side of the rod mounting the switch 92. The switch 92 is embodied in the circuit utilized for energizing the motor M. In the case illustrated the operating arm 93 of the switch 92 will be spring loaded to an "on" position seen in FIG. 5 of the drawings. In the "on" position of the switch 92 the motor M, if energized, will remain energized. As will be further described, in the event stress applied to the torque arm 10 should produce a longitudinal and/or lateral displacement thereof sufficient to induce a pivoting of the arm 93 to an "off" position, then the circuit energizing the motor M will be caused to open, thereby to de-energize the motor and prevent its further operation until the torque arm 10 is relieved of what is an objectionable degree of applied stress.

Noting FIGS. 2 and 3 of the drawings, there is fixed to the top of the plate member 62, adjacent one side edge thereof a bracket 64 suitably apertured and arranged to receive in an aperture thereof the hook-like extremity of a heavy coil spring 66 to the opposite end of which is welded an axial extension in the form of a threaded rod 68. The spring 66 is directed rearwardly generally over and in a vertical plane commonly occupied by the underlying rod member 48 which mounts the switch 92, to have the threaded rod 68 project through one of a plurality of vertically spaced apertures 72 formed in an anchor plate projected vertically of the post 44 to which the rod member 48 underlying the spring 66 is pivotally coupled. As may be seen from FIG. 3, to the side of this anchor plate remote from the spring 66 the rod 68 is threadedly engaged by a nut the adjustment of which will apply a selected tension to the spring 66 in a manner believed clearly obvious. In this manner there is provided a resilient connection between the main beam portion of the torque arm 10, constituted by the parts 52 and 54, and ring 28 which extends rearwardly and upwardly from the beam and, in the case illustrated, in a sense angled laterally thereof. The purpose and benefits of this feature of the invention will soon become obvious.

Noting FIG. 3, the outer projected extremity of the spout 40 is mounted in spaced elevated relation to the outer telescoping part 54 through the medium of a support structure comprised of a rod 78 to the lower end of which is fixed an inverted laterally extended U-shaped saddle member 80 the dependent legs of which position to the respectively opposite sides of the part 54 and receive therethrough pivot pins projected from the sides of the part 54. The lower end of this support structure is thereby pivotally related to the part 54. Fixed to provide an extension of the upper end of the rod 78 is a relatively deep U-shaped saddle member 76 the leg portions of which project upwardly to either side of the outer end of the spout 40 to have their upper extremities pivotally connected to bracket means at the top and to the respective sides of the spout member 40.

Thus, by virtue of the rod member 78 and its saddle shaped extremities a connection is provided to insure following movements as between the outer end of the chute 40 and the telescoping part 54.

To commence operation of the unloader, improved as described, the winch controlling the cables 14 will be energized, either manually or under power if the same is so provided, with the object to carefully lower the unloader in the silo to the level of the bed of silage and to a degree that the projected portion of the auger blades will have a limited bite with the silage. If this is done properly and the motor M energized, the auger housing 34 and connected structure will be rotated in a circular path within the silo and the auger itself will be caused to turn. As the auger turns, it will cut into, loosen, pick up fragments of the underlying silage and, in the course of a 360° rotation thereof drive such fragments rearwardly of the housing 34 and into the impeller of blower 42. On receipt of these fragments the blower will discharge the loose silage in a fluid flow which is directed upwardly to enter the inverted channel defined by the spout 40 and move smoothly over the inverted base of the spout to be laterally contained by its sides as it moves to discharge from the window or opening in the silo wall with which the spout is then aligned. The outer end of the beam comprised of the parts 52 and 54 will have previously been positioned to engage the hook-like finger 56 over the base B of the window or opening in the silo wall through which silage is desired to be first discharged. This will be in accordance with the level of the silage in the silo.

In the operation of the auger assembly comprised of the housing 34, the auger 32 and interconnected parts, both the spring 66 and the construction of the torque arm 10 function to significantly offset and inhibit the previous undesirable effect of the constantly changing axis about which the auger and its housing rotates under the influence of an out of round configuration of the inner wall surface of the silo. This changing axis may shift in parallel planes, incline to a vertical, and/or shift and incline to a vertical. Even though the shifting and-/or inclination may be limited it will nevertheless be directly reflected to the base frame provided for the auger and its housing by the tracking ring 28, from which the auger, its housing and associated parts are suspended in the tracking operation. By virtue of the improved construction of the torque arm and related parts, per the present invention, the stresses transmitted due to the out of round condition of the silo wall will be accommodated by the bearing containment of the beam part 54 by the rollers 60 internally of and to the respective sides of the part 52. Not only is there a free longitudinal adjustment permitted as between the parts 54 and 52 but there is a permissive slight lateral and angular displacement provided for as between the parts 52 and 54. This last is by reason of their relative dimension and the positioning of the bearing rollers 60.

Accordingly, as the housing 34 and its related structure causes jolting and rocking of the base frame, including the ring 28, from which they are suspended, the torque arm assembly and its mounted elements readily accommodate the same without appreciable binding, bending or damage. The fact that the rear divergent ends of the rod elements 48 have a pin-slot connection to the posts 44 lends assistance in this respect. The net result is to substantially reduce the possibility of damage and wear and the need for the extensive maintenance or replacement procedures normally encountered in use of conventional silo unloading equipment which does not have the improvements of the present invention.

Further unobvious advantages are inherent in the application and disposition of the spring unit 66. This unit has been found unexpectedly to substantially ease the effort required to manually position and reposition the spout assembly as required in a silo. It is significant to note that the bias which the spring 66 applies on the torque arm 10 is not intended to fully balance the spout assembly. It rather provides a means effective to store energy in the manipulation of the spout assembly which lends assistance and ease to its raising and lowering movements. The spring 66 further assists in maintaining the alignment of the torque arm, so important to avoid damage and wear.

The resilient connection provided by the spring unit 66 is such that, when the hook 56 is disengaged from its normal support on the frame of an opening in the silo wall for purpose of moving the spout assembly to a next lower opening, it does not balance but rather dynamically resists the normal tendency of the torque arm assembly to drop and place the full load thereof on the person who must move it from one opening to another. Attention is directed to the fact that the plurality of apertures 72 which are provided in vertically spaced relation in the anchoring means for the rearmost end of the threaded rod extension 68 of the spring unit 66 enables a selected adjustment of the dynamic balance influence of the spring unit 66 on the torque arm 10. Moreover, the application of the nut 70 to the threaded rod 68 serves also as a medium for changing the tension on the spring unit 66 and thereby the influence thereof in manipulation of the torque arm 10 and the spout 40.

In any case, the application of the spring unit 66 and the manner in which it is anchored affords unobvious benefits and greatly assists in overcoming the difficulties of manipulating the torque arm and the spout assembly of which it forms a part.

Most important are the improvements evidenced in FIGS. 5 and 6 of the drawings. While unobvious, it is a fact that oftentimes in either manually or automatically lowering the silo unloader sufficiently to bring the auger to a position to cut and discharge the next layer of silage within a silo, the unloader unit is dropped too far. The result of this is to bury the auger and its housing in the soft bed of silage. This causes the auger to be choked, thereby preventing its proper operation under the influence of the drive from the motor M. Not only this but the auger housing will then be so buried in the silage that the silage forms an obstruction against which the housing cannot be moved in order to move the rotating auger in a circular path as required for the proper operation of the unloader. Since the motor M is energized when the jam occurs, if the jam of the auger is not immediately relieved and the path of its housing cleared, the problems resulting produce immediate requirements for maintenance and possible replacement of parts in the tracking system, that is in the drive from the motor M to the gear 39. By reason of the conditions existing including the fact the auger can neither rotate nor can it be moved in a circular path, as the motor M continues to drive it induces a reactive rotation of the ring 28 from which the auger is suspended. This causes the outer end portion 54 of the main beam of the torque arm 10 to be brought up against one side of the window frame in which it is positioned. With conventional equipment and absent the improvements of the present invention the continuing stress induced thereby causes bending and binding of the torque arm portion 54 with reference to the arm portion 52. However, with inclusion of the elements of the present invention as shown in FIGS. 5 and 6, the stress and strain which occurs under such circumstances will cause the torque arm 10 to be pulled forward relative its anchor posts 44, as permitted by the pin-slot connection between the brackets 46 and the anchor posts. As a direct result thereof, the operator arm 93 of the switch 92 is caused, through the medium of cable 94, to move to an "off" position. This immediately opens the circuit to the motor M and shuts it off.

Since the arrangement shown in FIGS. 5 and 6 will be such as to normally provide that the switch 92 will open the circuit of the motor M before a really severe jam of the auger and its housing can take place, all one needs to do is to operate the winch to raise the unloader assembly to immediately relieve the strain on its parts and normally without significant damage or maintenance requirements. The inclusion of this last described improvement of the invention is a most important benefit. It eliminates the necessity of going up and down in the silo to relieve jams. This is apart from the fact that one avoids bending of the torque arm and consequent damage of the torque arm parts which in many cases might be reflected to other parts of the unloader structure. Apart from the time lost going up and down, it is exceedingly dangerous to deal with a jam of an auger in a silo. Thus the improvements of the present invention also add safety features.

The same benefits as above described with reference to FIGS. 5 and 6 are achieved in the event the auger or its housing hits any obstruction within the silo.

It is to be understood, moreover, that the slot provided in the pin-slot connection between the anchor posts 44 and the brackets 46 will be made very short and the cable 94 appropriately limited in length so it will not take very much stress on the torque arm to cut the operation of the motor M. This insures that there is no disastrous bending of the torque arm, no significant damage to clutches and drive systems, and no dangerous and frequent requirements for an operator of a silo unloader to run up and down within a silo to free an auger, adjust a clutch or tighten it or to replace the torque arm or clutch device.

While the invention improvements are shown in application to a certain type of conventional unloader it is intended and obvious that either singly or in combination they may be applied with similar benefit in any type of silo unloader.

It should thus be apparent from the foregoing that not only do the devices of the character described possess the particular features of advantage above enumerated but that the same are obviously susceptible of modification as to form, proportion, detail construction and arrangement of parts without departing from the principles involved or sacrificing any of their advantages.

It is to be understood, moreover, that the means and construction and the application of the improvements herein disclosed comprise but one of several modes of applying the invention and the invention is therefore claimed in any of its forms or modifications within the legitimate and valid scope of the appended claims.

The embodiments of the invention in which an exclusive property or privilege is claimed are defined as follows:

1. A silo unloader including a frame adapted for mounting so as to resist rotation, material moving means mounted on and for rotation relative to said frame, said material moving means being operative to remove and deliver silage from an underlying bed thereof to an overlying spout, said spout being in overlying relation to a torque arm and connected therewith, means defining a pivotal connection between said torque arm and said frame, means for a powered drive of said material moving means for rotation thereof with respect to said frame and control means in connection with said torque arm including means responding to a predetermined lateral stress applied to said torque arm to interrupt the operation of said drive means.

2. A silo unloader including a frame adapted for mounting so as to resist rotation, material moving means mounted on and for rotation relative to said frame, said material moving means being operative to remove and deliver silage from an underlying bed thereof to an overlying spout, said spout being in overlying relation to a torque arm and connected therewith, means defining a pivotal connection between said torque arm and said frame, means for a powered drive of said material moving means for rotation thereof with respect to said frame and control means in connection with said torque arm including means responding to a predetermined rotation of the torque arm producing thereon a predetermined stress in a sense reverse to the sense of its rotation to interrupt the operation of said drive means, said pivotal connection between said torque arm and said frame being provided by means accommodating relative raising and lowering movements of said torque arm relative to said frame and an axial shift of said torque arm relative said frame to activate said control means when said torque arm is subjected to a predetermined lateral stress.

3. A silo unloader including a frame mounting an auger unit for rotation relative thereto, said auger unit being operative to remove and deliver silage from an underlying bed thereof to an overlying spout, said spout being in overlying relation to a torque arm and connected therewith, means for drive of said auger unit for rotation thereof with respect to said frame, control means in connection with said torque arm including means responding to a predetermined stress being placed upon said torque arm to interrupt the operation of said drive means, and means defining a pivotal connection between said torque arm and said frame including means providing for a bodily shift of said torque arm relative to said frame to activate said control means when said torque arm is subjected to a predetermined stress, said pivotal connection being a pin-slot connection between said torque arm and said frame.

4. A silo unloader as in claim 3 wherein said control means includes a switch in connection with said torque arm and in a circuit for control of said drive means, the pin of said pin-slot connection is connected to said frame and the slot thereof in a portion of said torque arm and means connecting between said pin and said control means to selectively and automatically provide for an opening or closing of said switch in accordance with the direction of bodily shift of said torque arm with respect to the frame.

5. A silo unloader including a frame adapted for mounting so as to resist rotation, material moving means mounted on and for rotation relative to said frame, said material moving means being operative to remove and deliver silage from an underlying bed thereof to an overlying spout, said spout being in overlying relation to a torque arm and connected therewith, means defining a pivotal connection between said torque arm and said frame, means for a powered drive of said material moving means for rotation thereof with respect to said frame and control means in connection with said torque arm including means responding to a predetermined rotation of the torque arm producing thereon a predetermined stress in a sense reverse to the sense of its rotation to interrupt the operation of said drive means, said torque arm being comprised of telescoped parts defining a main beam for support of at least the discharge end of said spout which may be adjusted as to its length to accommodate a shift of the positioning of the discharge end of the spout from alignment with one discharge opening in a silo to another, and bearing means between the telescoped parts of said main beam provide for a relatively free and smooth displacement of one telescoped part relative the other, said bearing means including bearing means between the inner and outer of the relatively telescoped parts, the relative disposition of said bearing means and the dimensional relation of the telescoped portions of said parts providing an accommodation of a shift of one of said parts relative the other in a transverse plane of said main beam whereby to accommodate a predetermined amount of stress created in an obstruction to the free rotation of said material moving means relative to said frame without damage to said parts.

6. A silo unloader including a frame mounting an auger unit for rotation relative thereto, said auger unit being operative to remove and deliver silage from an underlying bed thereof to an overlying spout, said spout being in overlying relation to a torque arm and connected therewith, means defining a pivotal connection between said torque arm and said frame, means for drive of said auger unit for rotation thereof with respect to said frame, control means in connection with said torque arm including means responding to a predetermined stress being placed upon said torque arm to interrupt the operation of said drive means, said torque arm extending generally radially from and outwardly of said frame and including on the projected extremity thereof means for engaging a silo wall portion to position the discharge end of said spout in adjacent relation to and in alignment with an opening in the silo wall, said torque arm being comprised of telescoped parts having a relatively free nesting relation as between the inner and the outer of the parts thereof in an arrangement providing for a lateral shift of one part relative another to accommodate a predetermined amount of stress being applied to said torque arm without damage to the parts thereof, and an additional connection between the torque arm and said frame, said additional connection including resilient means adapted to apply a dynamic tension to said torque arm in the event of a predetermined lowering thereof under circumstances where it is free of support by other than its connection to said frame, thereby to facilitate raising and lowering movements of said silo torque arm and the overlying portion of the spout which is mounted thereon.

7. A silo unloader as in claim 6 characterized in that said resilient connection means has the form of a coil-type spring extended at one end thereof by a bolt-like element which is externally threaded and means are provided in connection with said frame to accommodate said bolt-like element and further means in association with said bolt-like element and said means which accommodates the same for adjustably and threadedly engaging said bolt-like element to thereby provide means for applying a predetermined tension on said spring at the inner end thereof in connection with said frame, the outer end of said spring being in connection with means defining an anchor therefor on said torque arm.

8. A silo unloader including a frame, an auger unit mounted in connection therewith and for rotation relative thereto, said auger unit being operative to remove and deliver silage from an underlying bed thereof to an overlying spout, said spout being in overlying relation to a torque arm and having at least the discharge end thereof connected with said torque arm, means defining a pivotal connection between said torque arm and said frame, means for drive of said auger unit for rotation thereof with respect to said frame, said torque arm being comprised of telescoped parts defining a main beam for support of at least the discharge end of said spout, said main beam being comprised of parts enabling the adjustment of its length to accommodate a shift of the positioning of the discharge end of said spout from alignment with one discharge opening in a silo wall to another, bearing means between the telescoped parts arranged to provide for a relatively free and smooth displacement of one telescoped part relative the other, said bearing means positioning to opposite sides of the inner of the telescoped parts and being arranged to accommodate limited lateral and angular displacement of one of the telescoped parts relative the other, and control means in connection with said torque arm including means responding to a predetermined stress being placed upon said torque arm to interrupt the operation of said drive means, said predetermined stress being signalled by a laterally applied force upon said torque arm tending to move said torque arm relative the frame an amount which is greater than that accommodated by the capability of limited lateral and angular displacement of said one of said telescoped parts relative the other.

9. A silo unloader including a frame, an auger unit mounted for rotation relative thereto, said auger unit being operative to remove and deliver silage from an underlying bed thereof to an overlying spout, said spout being in overlying relation to a torque arm and having at least the discharge end thereof connected with said torque arm in a manner to provide for one thereof to follow the movements of the other to form thereby an assembly which can be raised and lowered as a unit relative to said frame, means defining a pivotal connection between said torque arm and said frame, means for drive of said auger unit for rotation thereof with respect to said frame, said torque arm being arranged to extend generally radially outward from and in projecting relation to said frame, and means defining an additional connection between said torque arm and said frame constructed and arranged to store energy therein to provide a safety factor in the event the projected extremity of said torque arm is unsupported by the silo wall in which the unloader is positioned, as in the case of conditions where the discharge end of the spout must be moved from one position within the silo to another, said additional connection being constructed and arranged to dynamically assist in and to facilitate the raising and lowering of the assembly comprising the torque arm and the spout as said assembly must be raised or lowered within a silo, said additional connection being defined by resilient means one end of which is anchored to a portion of said torque arm intermediate its length and the other end of which is anchored to means in connection with said frame.

10. Apparatus as in claim 9 characterized in that control means are provided in connection with said torque arm including means responding to a predetermined level of stress created between said frame and said torque arm by an obstruction to the free rotation of said auger unit relatively to said frame to interrupt the operation of said drive means.

11. A silo unloader including a frame, an auger unit mounted for rotation, relative thereto, said auger unit being operative to remove and deliver silage from an underlying bed thereof to an overlying spout, said spout being in overlying relation to a torque arm and having at least the discharge end thereof connected with said torque arm, means defining a pivotal connection between said torque arm and said frame, means for drive of said auger unit for rotation thereof with respect to said frame, said torque arm being arranged to extend generally radially outward from and in projecting relation to said frame, a resilient connecting means one end of which is anchored to a portion of said torque arm intermediate its length and the other end of which is anchored to means in connection with said frame, said resilient connecting means being adapted to store energy therein in the event the projected extremity of said torque arm is unsupported by the silo wall in which the unloader is positioned, as in the case of conditions wherein the discharge end of the spout must be moved from one position within the silo to another and being constructed to dynamically assist and to facilitate the raising and lowering of the torque arm and the spout which is supported thereby as the torque arm must be raised or lowered in the necessary movement thereof within a silo, a means to which said resilient connecting means is anchored comprising a plurality of vertically spaced stations to any one of which said resilient means may be anchored to apply a predetermined tension to control thereby the dynamic balancing influence which is afforded for the torque arm.

12. A silo unloader including a frame, an auger unit mounted for rotation relative thereto, said auger unit being operative to remove and deliver silage from an underlying bed thereof to an overlying spout, said spout being in overlying relation to a torque arm and having at least the discharge end thereof connected with said torque arm, means defining a pivotal connection between said torque arm and said frame, means for drive of said auger unit for rotation thereof with respect to said frame, said torque arm being arranged to extend generally radially outward from and in projecting relation to said frame, resilient connecting means anchored at one end to a portion of said torque arm intermediate its length and anchored at its other end to means in connection with said frame, said resilient connecting means being adapted to store energy therein in the event the projected extremity of said torque arm is unsupported by the silo wall in which the unloader is positioned as in the case of conditions wherein the discharge end of the spout must be moved from one position within the silo to another and being constructed to dynamically assist and to facilitate the raising and lowering of the torque arm and the spout which is supported thereby as the torque arm is raised or lowered in the necessary movement thereof within a silo, said resilient means comprising a coil spring an extension of which is provided by an integrally connected threaded bolt-like object which is thrust through said anchor means in connection with said frame and has in association therewith, and with said anchor means, means for threadedly engaging the same to apply a predetermined tension to said spring.

13. A silo unloader as in claim 12 characterized in that said torque arm comprises a main beam composed of telescoped parts which extends generally radially to said frame and said means defining said resilient connection is angularly related to the longitudinal axis of said main beam.

14. A silo unloader including a frame, an auger unit mounted for rotation relative thereto, said auger unit being operative to remove and deliver silage from an underlying bed thereof to an overlying spout, said spout being in overlying relation to a torque arm and having at least the discharge end thereof connected with said torque arm to form therewith an assembly which can be raised and lowered as a unit relative to said frame, means defining a pivotal connection between said torque arm and said frame, means for drive of said auger unit for rotation thereof with respect to said frame, said torque arm being arranged to extend generally radially outward from and in projecting relation to said frame, means defining an additional connection between said torque arm and said frame adapted to store energy therein to provide a safety factor in the event the projected extremity of said torque arm is unsupported by the silo wall in which the unloader is positioned, as in the case of conditions wherein the discharge end of the spout must be moved from one position within the silo to another, said additional connection being defined by resilient means one end of which is anchored to a portion of said torque arm intermediate its length and the other end of which is anchored to means in connection with said frame and control means provided in connection with said torque arm including means responding to a predetermined level of stress created on said torque arm to interrupt the operation of said drive means, and said torque arm being comprised of telescoped parts defining a main beam for support of at least the discharge end of said spout which may be adjusted as to its length to accommodate a shift of the positioning of the discharge end of said spout from alignment with one discharge opening in a silo to another and having means between said telescoped parts of said main beam in the nature of freely rotating roller bearings which are adapted to provide for a relatively free and smooth displacement of one telescoped part relative the other.

15. A silo unloader including a frame adapted for mounting so as to resist rotation, material moving means mounted on and for rotation relative to said frame, said material moving means being operative to remove and deliver silage from an underlying bed thereof to an overlying spout, said spout being in overlying relation to a torque arm and connected therewith, means defining a pivotal connection between said torque arm and said frame, means for a powered drive of said material moving means for rotation thereof with respect to said frame and control means in connection with said torque arm including means responding to a predetermined stress on said torque arm to interrupt the operation of said drive means, said torque arm including inner and outer parts, the outer part being extensible relative the inner part, said arm being connected to said frame through said inner part, resilient means being applied to interconnect said frame and said inner part of said torque arm and said pivotal connection between said torque arm and said frame being provided by means accommodating relative raising and lowering movements of said torque arm relative to said frame and an axial shift of said torque arm relative to said frame to activate said control means when said torque arm is subjected to a predetermined lateral stress.

16. A silo unloader as in claim 3, wherein said torque arm has a telescopic construction in which an outer end of said outer part is adapted to anchor to a silo wall and the inner end of said inner part has a pin-slot connection to said frame, and said control means includes a switch and a switch operating cable one of which attaches in connection with the inner part of said torque arm and the other of which attaches to means in connection with said frame.

17. A silo unloader as in claim 16, wherein a resilient means interconnects said inner part of said torque arm and said frame.

* * * * *

UNITED STATES PATENT AND TRADEMARK OFFICE
CERTIFICATE OF CORRECTION

PATENT NO. : 4,091,940
DATED : May 30, 1978
INVENTOR(S) : Gregory Schmiesing

It is certified that error appears in the above-identified patent and that said Letters Patent are hereby corrected as shown below:

Col. 1, line 62, "be" is corrected to read -- by --.

Col. 3, line 32, delete the period after "silo".

Col. 7, line 42, "s" is corrected to read -- a --.

Col. 12, line 62 (Claim 4, line 6) "connecting" is corrected to read -- connect --.

Signed and Sealed this

Thirty-first Day of October 1978

[SEAL]

Attest:

RUTH C. MASON
Attesting Officer

DONALD W. BANNER
Commissioner of Patents and Trademarks